(12) United States Patent
Neudorf et al.

(10) Patent No.: US 7,971,886 B2
(45) Date of Patent: Jul. 5, 2011

(54) STEERING FOR TOWED IMPLEMENTS (75) Inventors: Blake Neudorf, Vonda (CA); Scott Fairbum, Vonda (CA)

(73) Assignee: Highline Manufacturing Ltd., Saskatchewan (CA)

( * ) Notice: Subject to any disclaimer, the term of this patent is extended or adjusted under 35 U.S.C. 154(b) by 169 days.

(21) Appl. No.: 12/201,613

(22) Filed: Aug. 29, 2008

(65) Prior Publication Data
US 2009/0184491 A1   Jul. 23, 2009

(30) Foreign Application Priority Data
Jan. 18, 2008  (CA) .................................. 2618175

(51) Int. Cl.
*B62D 13/04* (2006.01)
*A01B 69/00* (2006.01)
*B60B 33/02* (2006.01)
*A01D 34/66* (2006.01)

(52) U.S. Cl. .................. 280/87.2; 280/93.502; 180/402; 172/288; 172/278

(58) Field of Classification Search .............. 280/87.2, 280/89, 89.1, 89.11, 89.12, 89.13, 91.1, 93.501, 280/93.502, 93.506, 93.507, 93.508, 93.509, 280/93.51, 93.511, 99, 103, 445, 776; 180/402, 180/403, 408, 411, 432, 433, 440; 16/35 R, 16/35 D; 56/6, 7, 15.4; 172/278, 286, 288, 289

See application file for complete search history.

(56) References Cited

U.S. PATENT DOCUMENTS

| | | | | |
|---|---|---|---|---|
| 2,379,170 A * | 6/1945 | McDaniel | ................ | 280/476.1 |
| 4,359,105 A * | 11/1982 | Van Natta | ................ | 172/386 |
| 4,368,806 A * | 1/1983 | Raineri | ................ | 188/2 R |
| 4,944,355 A * | 7/1990 | Karchewski | ................ | 172/278 |
| 5,221,100 A * | 6/1993 | McNutt | ................ | 280/78 |
| 6,202,396 B1 | 3/2001 | Thomas | | |
| 6,659,491 B2 * | 12/2003 | Green | ................ | 280/423.1 |
| 6,668,965 B2 * | 12/2003 | Strong | ................ | 180/411 |
| 2009/0078511 A1 * | 3/2009 | Boyko | ................ | 188/1.12 |

FOREIGN PATENT DOCUMENTS
CA        1170100        7/1984
* cited by examiner

*Primary Examiner* — Joanne Silbermann
*Assistant Examiner* — Wesley Potter
(74) *Attorney, Agent, or Firm* — Dicke, Billig & Czaja, PLLC (57) ABSTRACT

An implement includes a caster wheel pivotally attached to the implement to support the implement for movement. A steering link is engaged with the caster wheel, and an actuator is operative to move the steering link from a neutral position to a controlling position. When the steering link is in the neutral position, the caster wheel can pivot about the caster axis through a 360 degree pivot range. When the steering link is moved to the controlling position, the caster wheel is oriented to roll toward a first side of the implement.

11 Claims, 10 Drawing Sheets

STEERING FOR TOWED IMPLEMENTS

This invention is in the field of towed implements and in particular a steering mechanism for such implements.

BACKGROUND

Towed implements are well known in numerous industries. Some implements include rear wheels to support the rear end of the implement while the front end of the implement is supported by the implement hitch resting on the drawbar of the towing vehicle. The implement hitch pivots with respect to the drawbar about a vertical axis provided by the drawpin, and this configuration allows tight turning of the implement and towing vehicle.

Where the towed implement is larger, the hitch or drawbar may not practically be designed to support the front end of the implement, and front wheels are provided to support the front end of the implement. These front wheels are typically caster wheels pivotally mounted about a vertical axis to facilitate turning the implement. Fixed wheels would be forced laterally and skid along the ground during turns causing considerable stress on the implement.

A problem with caster wheels is that they allow the implement to wander in some conditions, such as when working on a slope. Gravity will pull the front end down the slope, and the caster wheels simply follow and provide no counteracting force, so that the towed implement will pivot about the drawpin and the implement will move laterally, requiring the operator of the towing vehicle to make course corrections. Further, where the implement is for example a multi-blade rotary cut mower, when the mower skews instead of moving in a substantially aligned forward direction, proper overlap of the several blades on the mower may not be achieved and a strip of vegetation in the middle of the mower may be uncut.

SUMMARY OF THE INVENTION

It is an object of the present invention to provide a steering mechanism for towed vehicles that overcomes problems in the prior art.

In a first embodiment the present invention provides an implement apparatus adapted to be towed along the ground. The apparatus comprises a caster wheel pivotally attached to an implement about a substantially vertical caster axis, and operative to support the implement for movement along the ground. A steering link is engaged with the caster wheel, and an actuator is operative to move the steering link from a neutral position to a controlling position. When the steering link is in the neutral position, the caster wheel can pivot about the caster axis through 360 degrees. When the steering link is moved to the controlling position, the caster wheel is oriented to roll toward a first side of the implement.

In a second embodiment the present invention provides an implement apparatus adapted to be towed along the ground. The apparatus comprises right and left front caster wheels pivotally attached to a front portion of an implement about substantially vertical caster axes, and operative to support the implement for movement along the ground. A steering link is engaged with the caster wheels, and an actuator is operative to move the steering link from a neutral position to a controlling position. When the steering link is in the neutral position, the caster wheels can pivot about the caster axis through 360 degrees. When the steering link is moved to the controlling position, the right and left caster wheels are oriented to roll toward a first side of the implement.

In a third embodiment the present invention provides a method of steering an implement that includes a caster wheel pivotally attached to the implement about a substantially vertical caster axis and operative to support the implement for movement along the ground. The method comprises allowing the caster wheel to pivot about the caster axis through a 360 degree pivot range; and preventing the caster wheel from pivoting through a blocked portion of the pivot range to force the caster wheel into a desired portion of the range where the wheel is oriented to roll in a desired direction.

The apparatus and method thus provides a conveniently steerable implement that can act in a conventional mode with caster wheels pivoting freely to reverse and follow the tow vehicle around corners, and the like, and yet when it is desired to steer the implement, movement of the caster wheel can be restricted to orient the wheels in the required direction to steer the implement as desired.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-6 illustrate an embodiment of an implement apparatus 1 of the present invention. The illustrated implement apparatus 1 is adapted to be towed along the ground, and comprises right and left front caster wheels 3 pivotally attached to a front portion of an implement 5 about substantially vertical caster axes CA. The implement 5 is generally illustrated as a rotary mower such as is well known for cutting vegetation. Such mowers typically include front caster wheels 3, and fixed rear wheels 7 supporting the mower for movement along the ground. The castering action of the front wheels 3 allows the implement to move in reverse and follow the towing vehicle through turns, and allows the front end to move somewhat left or right when encountering obstacles, thus relieving stress on the implement and the tow vehicle. The illustrated caster wheels 3 are dual wheels such as are known for use in supporting heavy loads, but of course with smaller implements single caster wheels could be used as well.

While castering front wheels and fixed rear wheels is the common configuration, it is contemplated that the castering wheels could also be at the rear of the implement and the fixed wheels at the front in some applications.

The front caster wheels 3 are mounted on corresponding substantially vertically oriented pivot shafts 9 that are pivotally mounted to the implement 5. A drag arm 11A, 11B is connected to each pivot shaft 9 such that moving the drag arms 11A, 11B laterally causes the caster wheels 3 to pivot about the caster axis CA. In the illustrated embodiment each drag arm 11A, 11B is pivotally connected to a steering arm 13 fixed to the pivot shaft 9 of the corresponding caster wheel 3.

Figure 2:
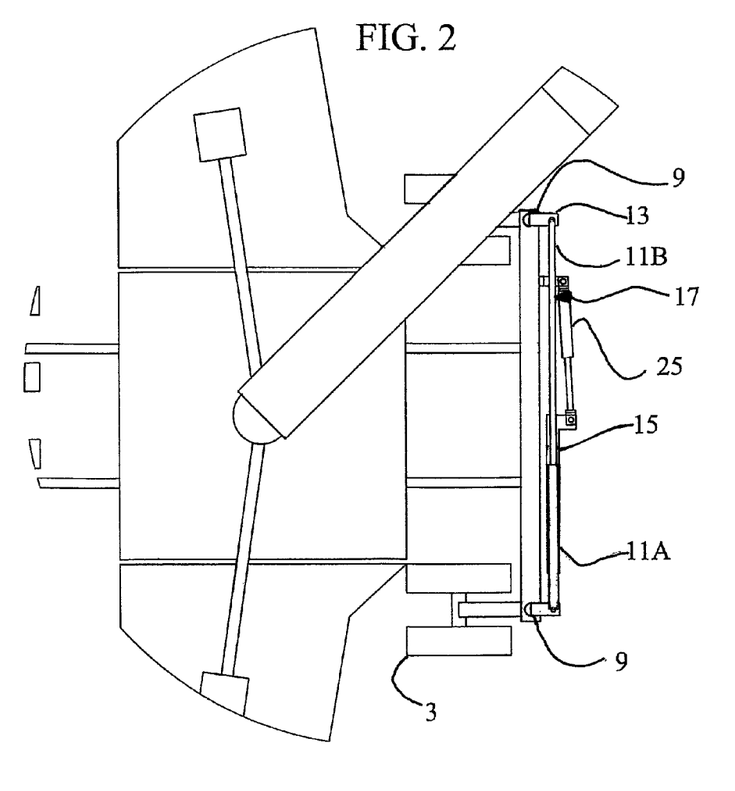
FIG. 2 is a top view of the caster wheels and steering mechanism of the embodiment of FIG. 1 in the neutral position of FIG. 1 with the caster wheels oriented in a straight ahead forward direction.
Figure 5:
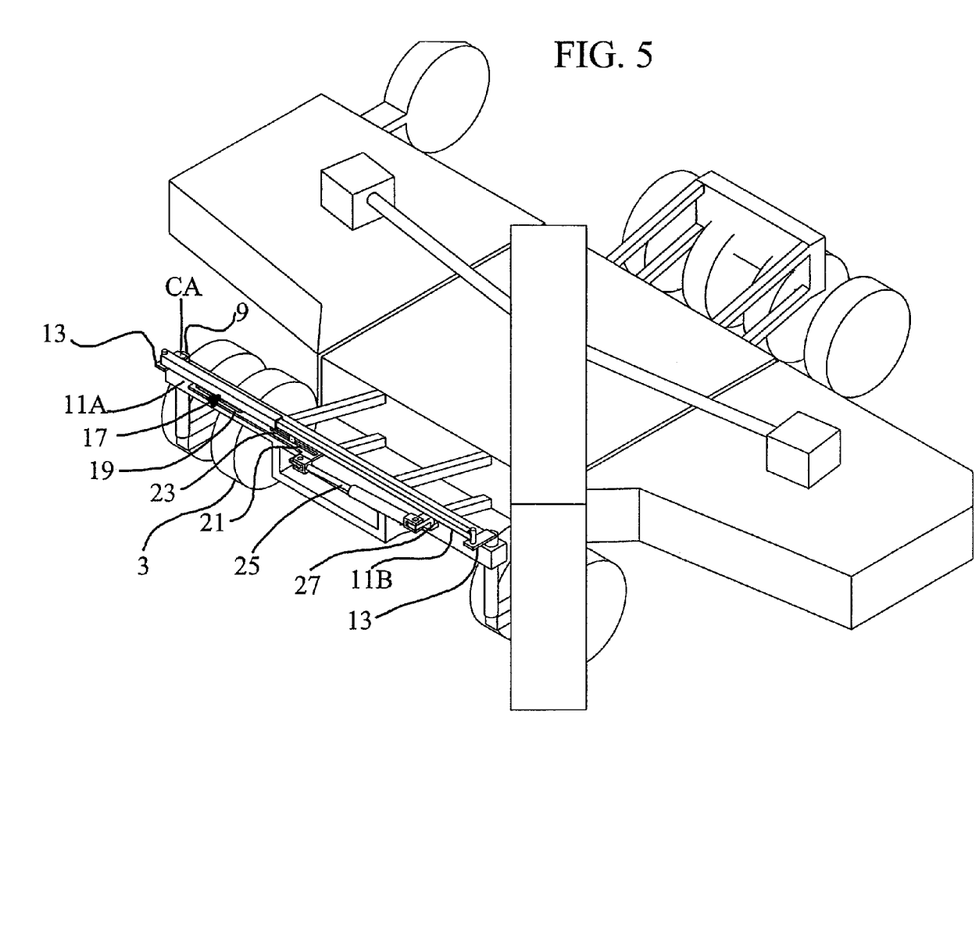
FIG. 5 is a perspective view of the caster wheels and steering mechanism of the embodiment of FIG. 1 in the neutral position of FIG. 1 with the caster wheels oriented in a straight ahead forward direction.
Figure 6:
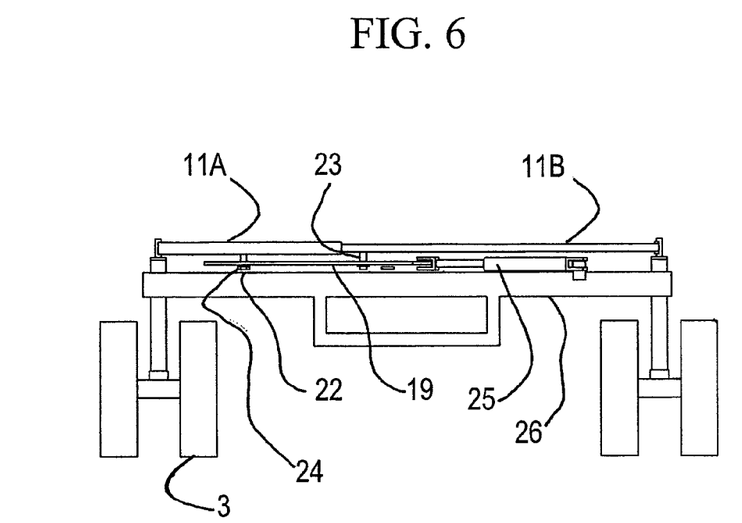
FIG. 6 is a front view of the caster wheels and steering mechanism of the embodiment of FIG. 1 in the neutral position of FIG. 1 with the caster wheels oriented in a straight ahead forward direction.

A steering link 15 is engaged with the caster wheels 3 through the drag arms 11A, 11B. In the illustrated embodiment, conveniently the drag arms 11A, 11B are configured to engage each other telescopically such that drag arm 11B can slide into drag arm 11A. Drag arms 11A, 11B extend toward each other and engage each other in a telescoping relationship such that the drag arms 11A, 11B form a substantially horizontal telescoping beam 17 between the steering arms 13 on the pivot shafts 9 of the right and left caster wheels 3.

Figure 3:
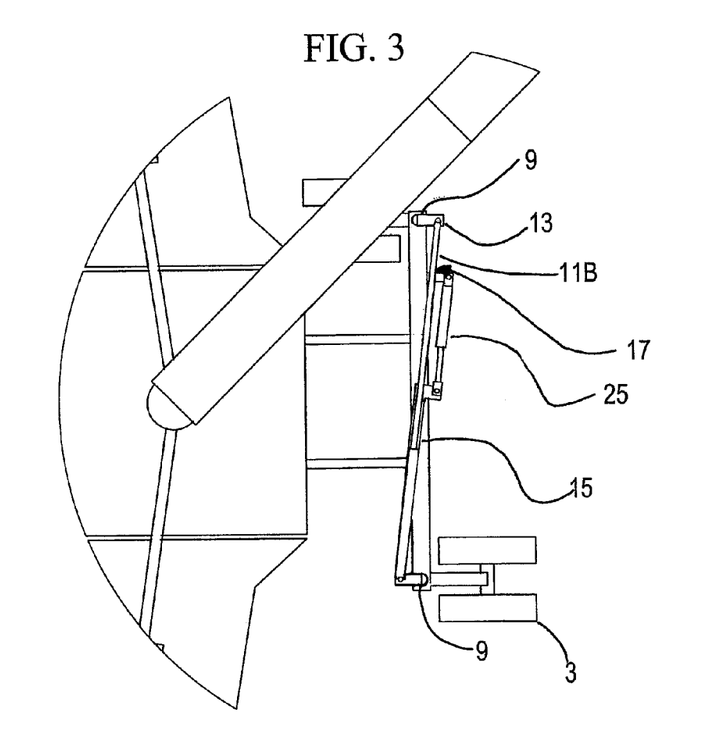
FIG. 3 is a top view of the caster wheels and steering mechanism of the embodiment of FIG. 1 in the neutral position of FIG. 1 with the caster wheels on the left side oriented in a straight ahead forward direction, and the wheels on the right side oriented in a reverse direction.
Figure 4:
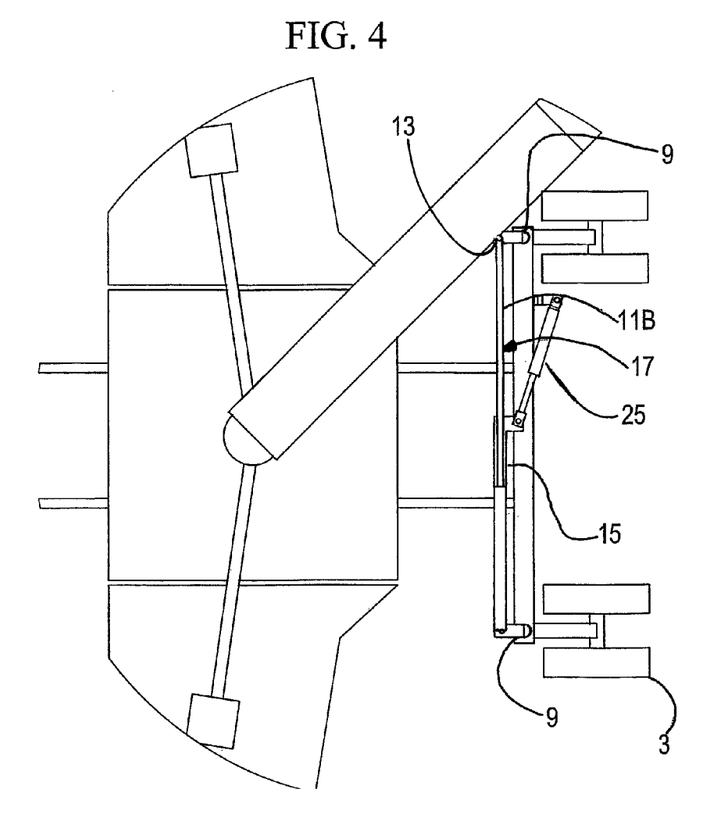
FIG. 4 is a top view of the caster wheels and steering mechanism of the embodiment of FIG. 1 in the neutral position of FIG. 1 with the caster wheels oriented in a reverse direction.

The steering link 15 comprises a plate 19 defining slots 21, and steering pins 23 extend from the drag arms 11A, 11B into the corresponding slots 21 to engage the drag arms 11A, 11B with the steering link 15. Washers 22 and roll pins 24 through the steering pins 23 support the plate 19 above the frame cross member 26, such that the steering link 19 can move rearward above the frame cross member 26, as illustrated in FIGS. 3 and 4, to allow the caster wheels 3 to pivot through 360 degrees, and thus allow the apparatus 1 to move in reverse.

An actuator is provided in the illustrated embodiment by an extendable hydraulic cylinder 25 connected at one end to the implement at frame lug 27, and connected at an opposite end to the plate 19 of the steering link 15. The hydraulic cylinder 25 is operative to move the steering link 15 from a neutral position, as illustrated in FIGS. 1-6 to a controlling position as illustrated in FIGS. 7-9.

Figure 1:
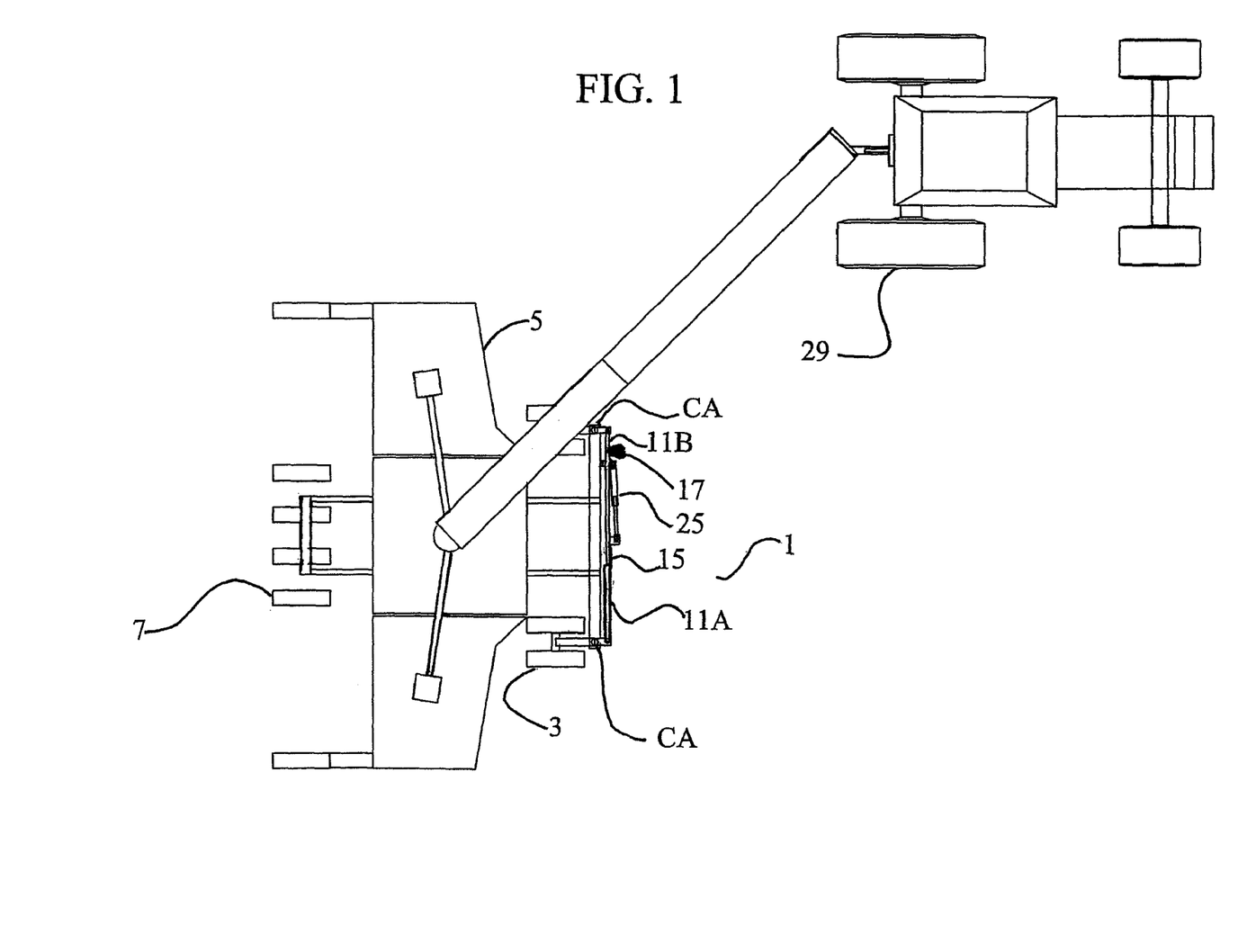
FIG. 1 is a top view of an embodiment of an implement apparatus of the present invention with the steering link in the neutral position and with the caster wheels oriented in a straight ahead forward direction.

When the steering link 15 is in the neutral position, the caster wheels 3 can pivot about the caster axis CA through a 360 degree range. Thus as shown in FIGS. 1-3 the steering pins 23 are located in the middle of the slots 21, and can move in either direction in the slots 21. Thus the caster wheels 3 can pivot about the caster axes CA to the left or right from the aligned straight ahead position shown in a normal unrestrained castering action to the reverse positions illustrated in FIGS. 3 and 4. As the caster wheels 3 pivot through 360 degrees, the steering arms 13 move the drag arms 11A, 11B and the drag arms 11A, 11B move freely in their telescoping relationship and the steering pins 23 move back and forth in the slots 21, but do not contact either end of the slots 21.

Figure 7:
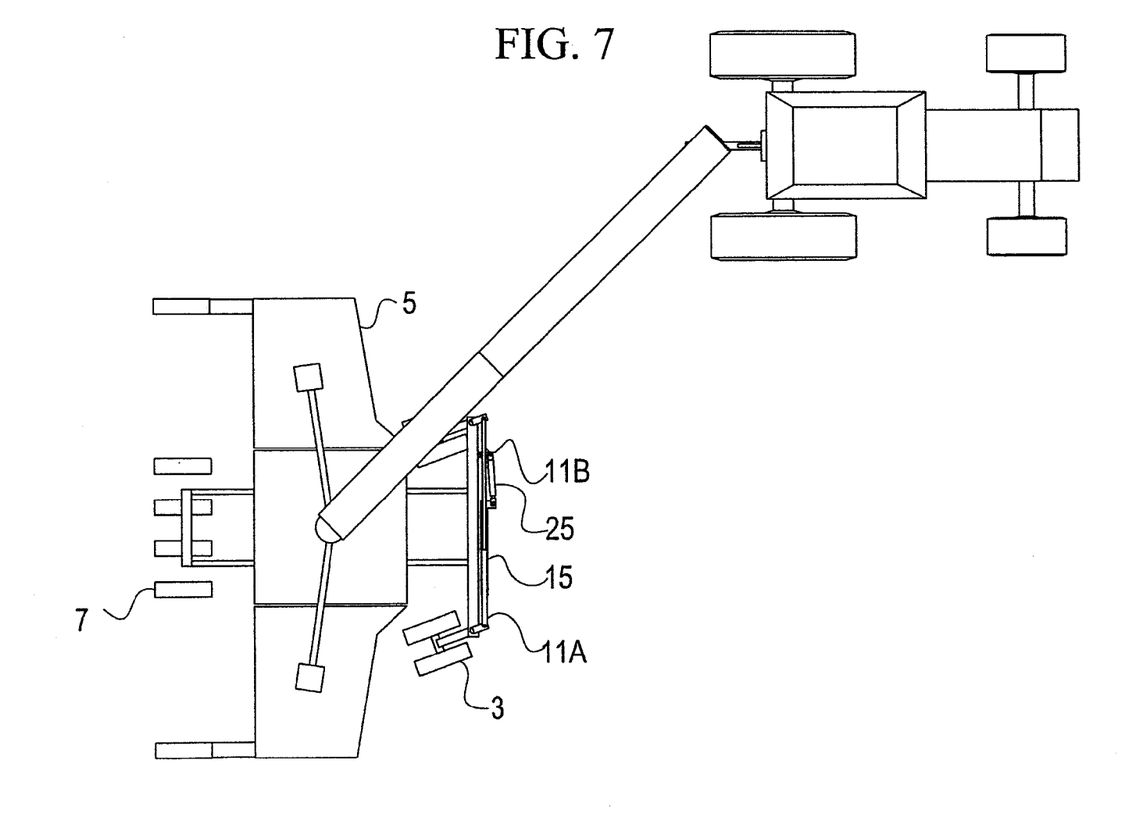
FIG. 7 is a top view of the embodiment of FIG. 1 with the steering link in a controlling position with the caster wheels oriented in a left steering direction.
Figure 8:
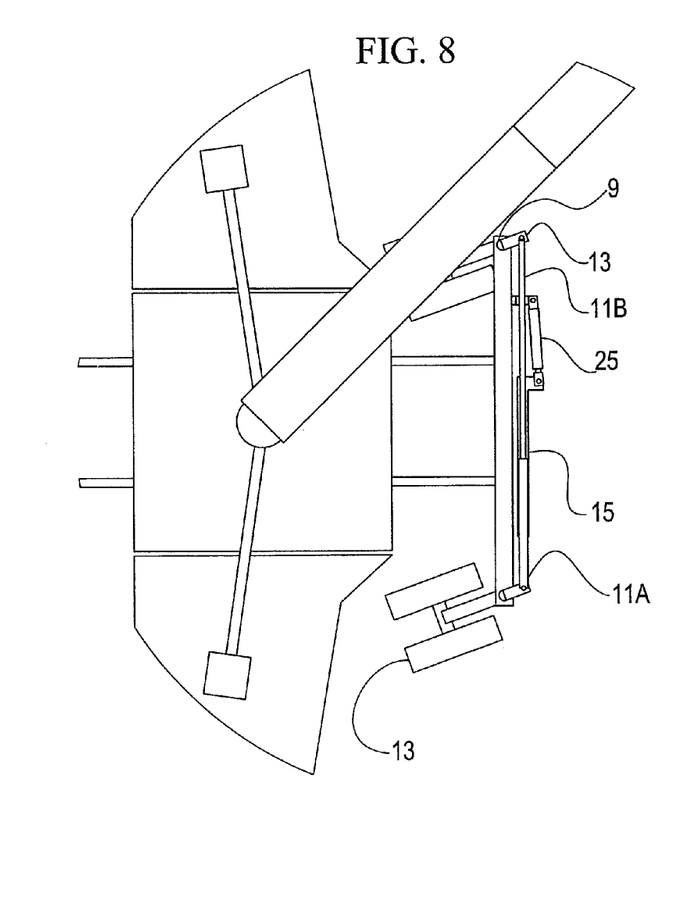
FIG. 8 is a top view of the caster wheels and steering mechanism of the embodiment of FIG. 1 in the controlling position of FIG. 4 with the caster wheels oriented in a left steering direction.
Figure 9:
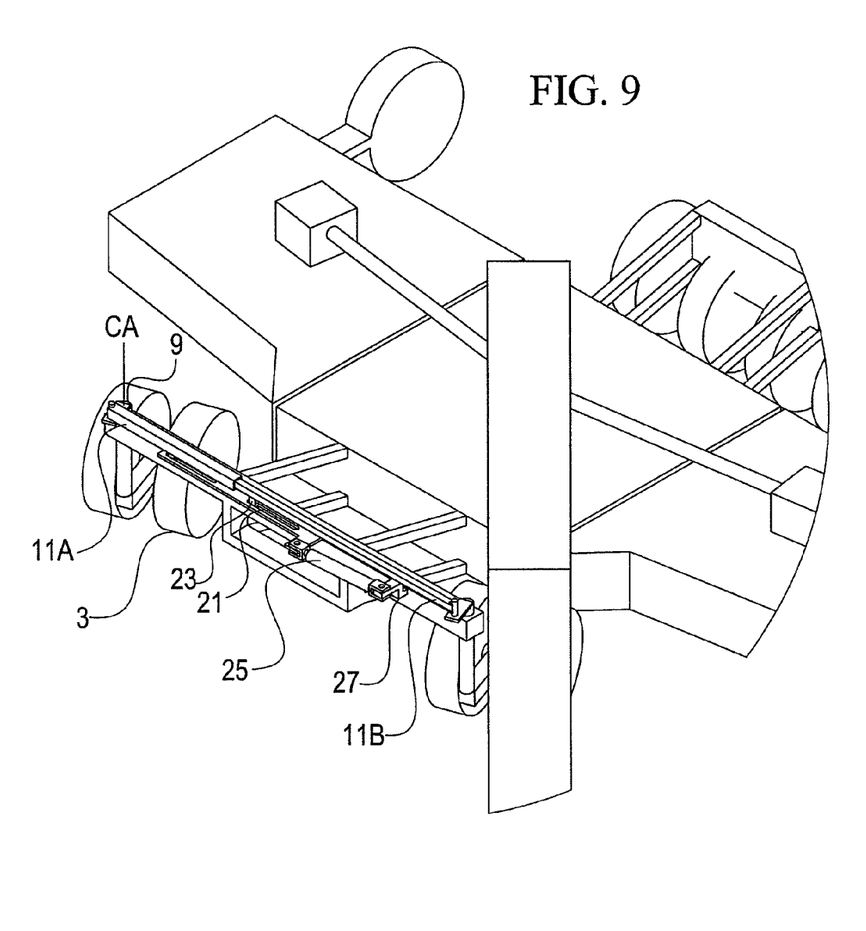
FIG. 9 is a front perspective view of the caster wheels and steering mechanism of the embodiment of FIG. 1 in the controlling position of FIG. 4 with the caster wheels oriented in a left steering direction.
Figure 10:
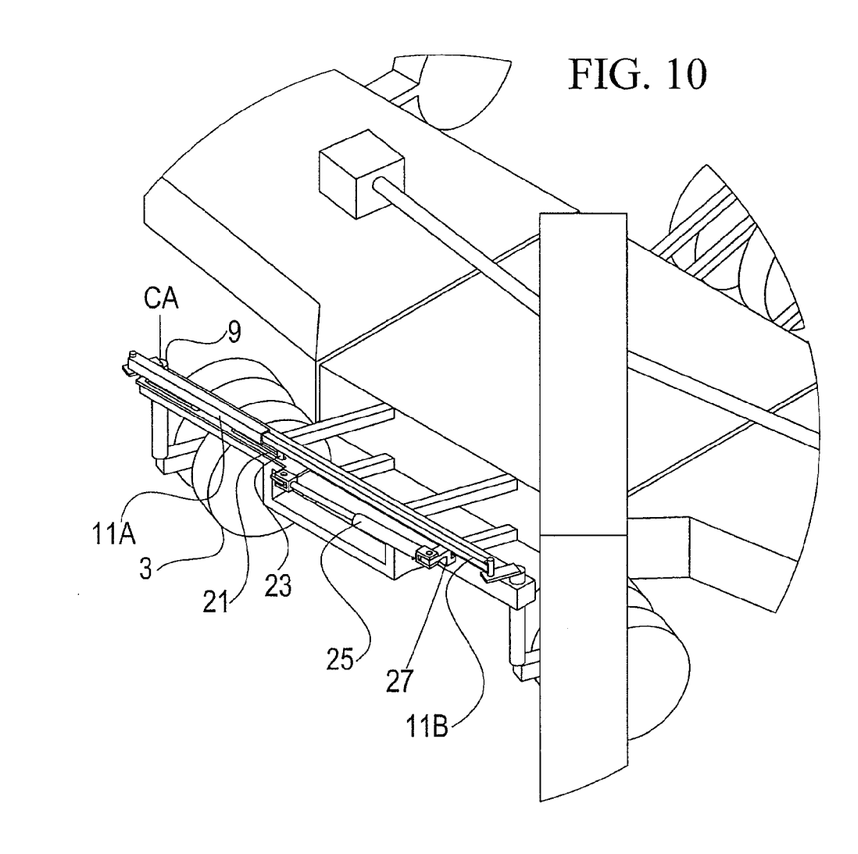
FIG. 10 is a front perspective view of the caster wheels and steering mechanism of the embodiment of FIG. 1 in a controlling position with the caster wheels oriented in a right steering direction.

The hydraulic cylinder 25 is retracted to move the steering link 15 from the neutral position to the left controlling position of FIGS. 7-9 where the caster wheels 3 are oriented to roll toward a left side of the implement 5. The hydraulic cylinder 25 moves the plate 19 to the left such that the ends of the slots 21 bear against the steering pins 23 on the drag arms 11A, 11B and as the plate 19 moves farther to the left, the drag arms 11A, 11B are pulled to the left and the caster wheels 3 steer to the left. Similarly FIG. 10 illustrates the hydraulic cylinder 25 extended to move the steering link 15 from the neutral position to the right controlling position where the caster wheels 3 are oriented to roll toward a right side of the implement 5. The hydraulic cylinder 25 moves the plate 19 to the right such that the opposite ends of the slots 21 bear against the steering pins 23 on the drag arms 11A, 11B and as the plate 19 moves farther to the right, the drag links 11 are pulled to the right and the caster wheels 3 steer to the right.

The illustrated embodiment is configured only to move the steering link 15 to the left controlling position. The implement 5 is illustrated as a mower with an offset hitch designed so that the tow vehicle 29 can drive along a road surface and the mower can mow a sloping ditch adjacent to the road surface. Thus in that situation it is only required to steer the mower to the left back up the slope. The hydraulic cylinder 25 could however be readily configured to extend from the position of FIGS. 1-6 and thus steer the mower to the right instead, or to both right and left.

Thus the invention discloses a method of steering an implement 5 that includes a front caster wheel 3 pivotally attached to a front portion of the implement 5 about a substantially vertical caster axis CA and operative to support the implement 5 for movement along the ground. The method comprises allowing the caster wheel 3 to pivot about the caster axis CA through a 360 degree pivot range. In order to steer the implement, the caster wheel 3 is prevented from pivoting through a blocked portion of the pivot range to force the caster wheel 3 into a desired portion of the range where the wheel 3 is oriented to roll in a desired direction.

The method is conveniently practiced by providing a steering link 15 engaged with the caster wheel 3, and an actuator 25 operative to move the steering link 15 from a neutral position to a controlling position, and configuring the steering link 15 such that when the steering link 15 is in the neutral position, the caster wheel 3 can pivot about the caster axis CA through 360 degrees, and such that when the steering link 15 is moved to the controlling position, the caster wheel 3 is prevented from pivoting through the blocked portion of the pivot range.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement apparatus adapted to be towed along the ground, the apparatus comprising:
   a caster wheel pivotally attached to an implement about a substantially vertical caster axis, and operative to support the implement for movement along the ground with the caster wheel behind the vertical caster axis when the implement is moving in a forward direction;

a steering link engaged with the caster wheel, and an actuator operative to move the steering link from a neutral position to a controlling position;

wherein when the steering link is in the neutral position, the caster wheel can pivot about the caster axis through 360 degrees;

wherein when the steering link is moved to the controlling position, the caster wheel is pulled toward a position oriented to roll toward a first side of the implement when the implement is moving in the forward direction;

wherein the caster wheel is mounted on a substantially vertically oriented pivot shaft that is pivotally mounted to the implement, the apparatus further comprising a drag arm connected to the pivot shaft such that moving the drag arm laterally causes the caster wheel to pivot about the caster axis, wherein the steering link is engaged with the drag arm;

wherein the drag arm is engaged in a slot in the steering link, and wherein the drag arm is engaged at a middle portion of the slot when the steering link is in the neutral position, and wherein the drag arm is engaged at an end of the slot when the steering link is moved to the controlling position.

2. An implement apparatus adapted to be towed along the ground, the apparatus comprising:

right and left caster wheels pivotally attached to a front portion of an implement about substantially vertical caster axes, and operative to support the implement for movement along the ground with the caster wheels behind the corresponding vertical caster axes when the implement is moving in a forward direction, a steering link engaged with the right and left caster wheels, and an actuator operative to move the steering link from a neutral position to a controlling position;

wherein when the steering link is in the neutral position, the right and left caster wheels can pivot about the caster axes through 360 degrees; and wherein the right and left caster wheels are pulled toward a position oriented to roll toward a first side of the implement when the steering link is moved to the controlling position and the implement is moving in the forward direction.

3. The apparatus of claim 2 wherein the right and left caster wheels are mounted on corresponding substantially vertically oriented right and left pivot shafts that are pivotally mounted to the implement, and comprising right and left drag arms connected to the corresponding right and left pivot shafts such that moving the drag arms laterally causes the caster wheels to pivot about their respective caster axes, and wherein the steering link is engaged with the right and left drag arms.

4. The apparatus of claim 3 wherein the right and left drag arms are engaged in corresponding right and left slots in the steering link, and wherein the right and left drag arms are engaged at middle portions of the corresponding right and left slots when the steering link is in the neutral position, and wherein the right and left drag arms are engaged at ends of the corresponding right and left slots when the steering link is in the controlling position.

5. The apparatus of claim 4 wherein:

the right and left drag arms extend toward each other and engage each other in a telescoping relationship such that the right and left drag arms form a substantially horizontal telescoping beam between the right and left pivot shafts;

the steering link comprises a plate defining the right and left slots, and a right steering pin extends from the right drag arm into the right slot and a left steering pin extends from the left drag arm into the left slot; and the actuator comprises an extendable actuator connected at one end to the implement and connected at an opposite end to the steering link.

6. An implement apparatus adapted to be towed along the ground, the apparatus comprising:

right and left front caster wheels pivotally attached to a front portion of an implement about substantially vertical caster axes, and operative to support the implement for movement along the ground with the caster wheels behind the corresponding vertical caster axes when the implement is moving in a forward direction;

a steering link engaged with the caster wheels, and an actuator operative to move the steering link from a neutral position to at least one controlling position;

wherein when the steering link is in the neutral position, the caster wheels can pivot about the caster axis through 360 degrees; and wherein when the steering link is moved to the controlling position, the right and left caster wheels are pulled toward a position oriented to roll toward a corresponding side of the implement when the implement is moving in the forward direction.

7. The apparatus of claim 6 wherein the actuator is operative to move the steering link from the neutral position to a right controlling position, where the caster wheels are oriented to roll toward a right side of the implement, and wherein the actuator is operative to move the steering link from the neutral position to a left controlling position, where the caster wheels are oriented to roll toward a left side of the implement.

8. The apparatus of claim 6 wherein the front caster wheels are mounted on corresponding substantially vertically oriented pivot shafts that are pivotally mounted to the implement, and comprising a drag arm connected to each pivot shaft such that moving the drag arms laterally causes the caster wheels to pivot about the caster axis, and wherein the steering link is engaged with the drag arms.

9. The apparatus of claim 8 wherein the drag arms are engaged in corresponding slots in the steering link, and wherein the drag arms are engaged at middle portions of the slots when the steering link is in the neutral position, and wherein the drag arms are engaged at corresponding ends of the slots when the steering link is in the controlling position.

10. The apparatus of claim 9 wherein:

the drag arms extend toward each other and engage each other in a telescoping relationship such that the drag arms form a substantially horizontal telescoping beam between the pivot shafts of the right and left caster wheels;

the steering link comprises a plate defining the slots, and steering pins extend from the drag arms into the corresponding slots; and the actuator comprises an extendable actuator connected at one end to the implement and connected at an opposite end to the steering link.

11. A method of steering an implement that includes a caster wheel pivotally attached to the implement about a substantially vertical caster axis and operative to support the implement for movement along the ground with the caster wheel behind the vertical caster axis when the implement is moving in a forward direction, the method comprising:

providing a steering link engaged with the caster wheel, and an actuator operative to move the steering link from a neutral position to a controlling position, and configuring the steering link such that when the steering link is in the neutral position, the caster wheel can pivot about the caster axis through 360 degrees, and such that when the steering link is moved to the controlling position, the caster wheel is prevented from pivoting through a blocked portion of the pivot range to force the caster wheel into a desired portion of the range where the wheel is oriented to roll in a desired direction when the implement is moving in the forward direction;

wherein the caster wheel is mounted on a substantially vertically oriented pivot shaft that is pivotally mounted to the implement, and comprising a drag arm connected to the pivot shaft such that moving the drag arm laterally causes the caster wheel to pivot about the caster axis, and wherein the steering link is engaged with the drag arm; and wherein the drag arm is engaged in a slot in the steering link, and wherein the drag arm is engaged at a middle portion of the slot when the steering link is in the neutral position, and wherein the drag arm is engaged at an end of the slot when the steering link is in the controlling position.

* * * * *